(12) United States Patent
Sreedhar et al.

(10) Patent No.: US 11,907,573 B2
(45) Date of Patent: Feb. 20, 2024

(54) PERFORMING BACKGROUND OPERATIONS DURING HOST READ IN SOLID STATE MEMORY DEVICE

(71) Applicant: Western Digital Technologies, Inc., San Jose, CA (US)

(72) Inventors: Pradeep Sreedhar, Bangalore (IN); Deepak Naik, Bangalore (IN); Bala Siva Kumar Narala, Bangalore (IN); Abhishek Shetty, Shanghai (CN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/353,176

(22) Filed: Jun. 21, 2021

(65) Prior Publication Data

US 2022/0405012 A1 Dec. 22, 2022

(51) Int. Cl.
G06F 3/06 (2006.01)
G06F 13/16 (2006.01)

(52) U.S. Cl.
CPC ........... *G06F 3/0659* (2013.01); *G06F 3/061* (2013.01); *G06F 3/0604* (2013.01); *G06F 3/0611* (2013.01); *G06F 3/0613* (2013.01); *G06F 3/0679* (2013.01); *G06F 13/1668* (2013.01)

(58) Field of Classification Search
CPC .... G06F 3/0611; G06F 3/0614; G06F 3/0616; G06F 3/0617; G06F 3/0619; G06F 3/0659; G06F 3/0652; G06F 3/0679; G06F 3/061; G06F 3/0613
See application file for complete search history.

(56) References Cited

U.S. PATENT DOCUMENTS

| | | | | |
|---|---|---|---|---|
| 9,959,209 | B1* | 5/2018 | Burton | G06F 3/0634 |
| 11,150,836 | B2* | 10/2021 | Williams | G06F 3/0679 |
| 11,379,137 | B1* | 7/2022 | Sharma | G06F 3/0619 |
| 2006/0090057 | A1* | 4/2006 | Saliba | G06F 3/0649 711/170 |
| 2009/0070647 | A1* | 3/2009 | Allison | G06F 11/106 714/746 |
| 2016/0162215 | A1* | 6/2016 | Jayaraman | G06F 3/0611 711/103 |
| 2016/0357471 | A1* | 12/2016 | Zevulun | G06F 3/061 |
| 2018/0232178 | A1* | 8/2018 | Iwaki | G06F 3/0659 |
| 2018/0300084 | A1* | 10/2018 | Kachare | G06F 11/3452 |
| 2020/0159442 | A1* | 5/2020 | Shida | G06F 3/0659 |
| 2020/0159448 | A1* | 5/2020 | Szubbocsev | G06F 3/0653 |
| 2020/0218325 | A1* | 7/2020 | Patel | G06F 1/28 |
| 2020/0319815 | A1* | 10/2020 | Dutta | G06F 3/0679 |
| 2021/0216239 | A1* | 7/2021 | Dutta | G06F 12/0253 |
| 2021/0223998 | A1* | 7/2021 | Li | G06F 12/0246 |

OTHER PUBLICATIONS

SD Card—how to reduce the power consumption? by System (Year: 2013).*
How to Use MMC/SDC by Chan (Year: 2019).*
Secure Digital card 2017 by Lelii (Year: 2017).*

* cited by examiner

*Primary Examiner* — Paul M Knight
(74) *Attorney, Agent, or Firm* — Michael Best & Friedrich LLP

(57) ABSTRACT

A SD Card including, in one implementation, a memory array, a controller coupled to the memory array, and a bus for transferring data between the memory array and a host device in communication with the SD Card. The controller is configured to perform background maintenance operations on the memory array during execution of a read command received from the host device.

13 Claims, 6 Drawing Sheets

| Host profile | Transfer speed supported by host (MBPS) | Time taken for 1 sector host transfer at host supported speed (us) | Time taken for 32kB host transfer (us) | Card max speed (MBPS) (Based on product line) | Time for 32kB host transfer at card max speed (us) | Throttle delay to be programmed between sectors (us) |
|---|---|---|---|---|---|---|
| DDR200 | 200 | 2.56 | 163.84 | 30 | 1092.266667 | 14.50666667 |
| | | | | 60 | 546.1333333 | 5.973333333 |
| | | | | 90 | 364.0888889 | 3.128888889 |
| SDR104 | 104 | 4.923076923 | 315.0769231 | 30 | 1092.266667 | 12.14359974 |
| | | | | 60 | 546.1333333 | 3.610256641 |
| | | | | 90 | 364.0888889 | 0.765811966 |

FIG. 3

| Card max speed (MBPS) | Time for 32kB transfer (us) at max speed | Time available for background operations every 32kB (us) |
|---|---|---|
| 30 | 1092.266667 | 822.2666667 |
| 60 | 546.1333333 | 276.1333333 |
| 90 | 364.0888889 | 94.08888889 |

FIG. 4

PERFORMING BACKGROUND OPERATIONS DURING HOST READ IN SOLID STATE MEMORY DEVICE

FIELD

This application relates generally to data storage devices, and more particularly, to a controller that performs firmware operations during host read and/or write operations to improve efficiency of maintenance of NAND memory in data storage devices.

BACKGROUND

Generally, firmware of data storage devices, in particular Secure Digital SD® cards need to perform NAND maintenance operations, such as Flash read/write operations apart from those initiated for host read/write, to maintain a healthy state of the card. In current SD cards, these maintenance operations are performed by the firmware only in the foreground, i.e. during read/write operations, instead of performing such operations in the background as background operations typically are disabled because SD cards are power sensitive such that background operations are disabled because the device is usually put to sleep within Sins of host inactivity to save power. Thus, there is a need for more time to perform background operations.

SUMMARY

General firmware background operations utilized by data storage devices are only performed during a host write operation, thus the performance of the SD card is reduced. Introducing a throttling module to control host transfer speed frees up the firmware and NAND flash for performing background operations during both host read and write and allows for improved performance of the data storage device.

One embodiment of the present disclosure includes a SD Card. The SD Card includes a memory array, a controller coupled to the memory array, and a bus for transferring data between the memory array and a host device in communication with the SD Card. The controller is configured to perform background maintenance operations on the memory array during execution of a read command received from the host device.

Another embodiment of the present disclosure includes a method for performing background maintenance operations on a memory array of a SD Card. The method includes transferring, with a controller of a SD Card, data between a memory array and a host device in communication with the SD Card. The method further includes receiving a read command from the host device, executing the read command with the controller, and performing, with the controller, background maintenance operations on the memory array during execution of the read command received from the host device.

Another embodiment of the present disclosure includes an apparatus for performing background maintenance operations on a memory array of a SD Card. The apparatus includes means for transferring data between the memory array and a host device in communication with the SD Card. The apparatus further includes means for receiving a read command from the host device, means for executing the read command, and means for performing background maintenance operations on the memory array during execution of the read command received from the host device.

Various aspects of the present disclosure provide for improvements in memory card devices. For example, optimizing firmware background operations by performing NAND maintenance during host read operations. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 3 is a chart illustrating a determination of a throttle delay to be programmed for the throttling module.

FIG. 4 is a table illustrating available time for background operations according to data storage device max speed, according to some embodiments.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
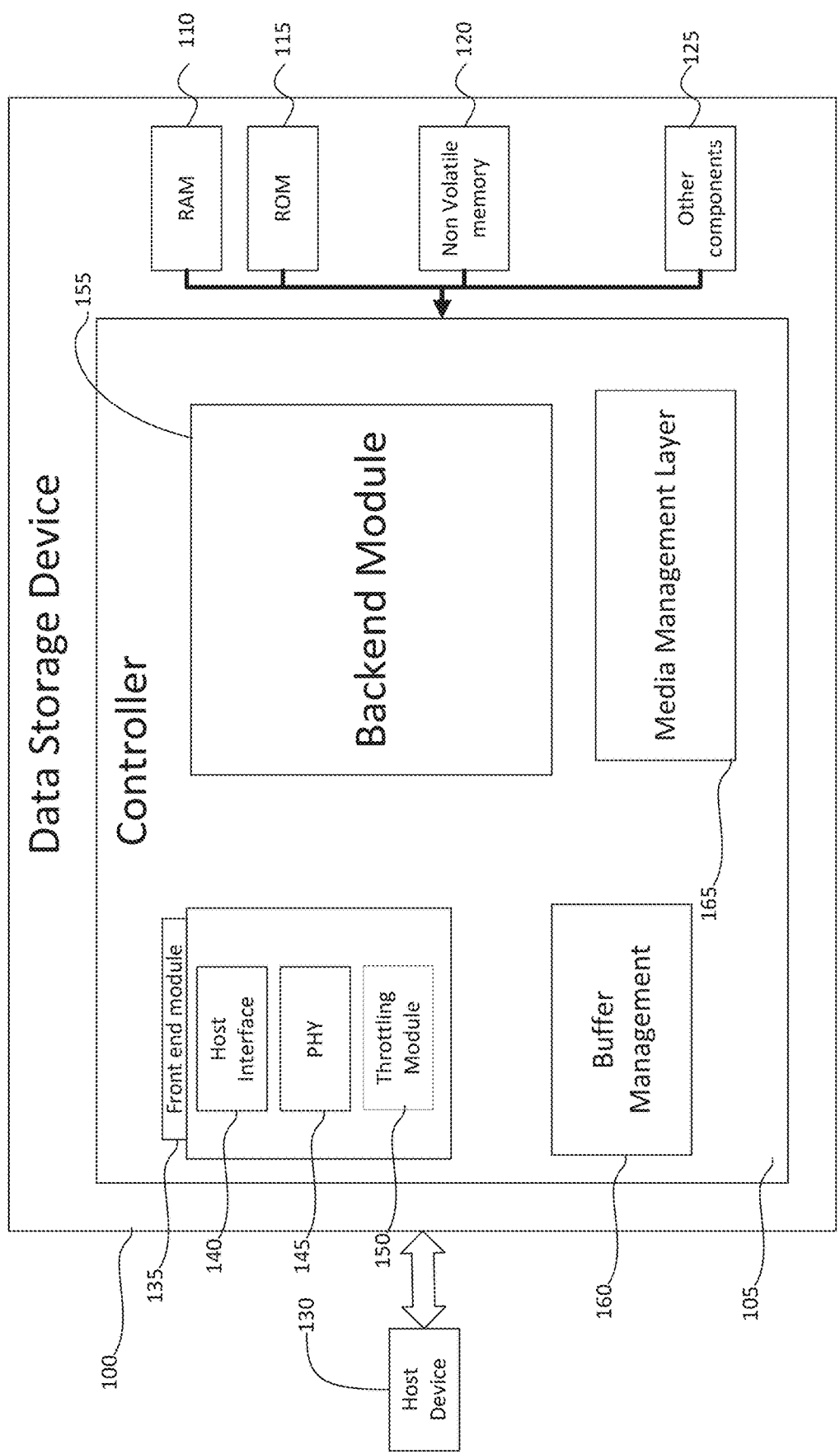
FIG. 1 is block diagram illustrating one example of a data storage device with a throttling module for performing firmware background operations during host read, according to some embodiments.

FIG. 1 is a block diagram of a data storage device 100 that includes firmware background operation optimization, in accordance with some embodiments. In some implementations, the data storage device 100 is a flash memory device. For example, the data storage device 100 is a Secure Digital SD® card, a microSD® card, or another similar type of data storage device. In the example shown, the data storage device 100 includes a controller 105. The data storage device 100 includes a random access memory (RAM) 110, a read-only memory (ROM) 115, a non-volatile memory 120 (i.e., a memory array), that are communicatively coupled to the controller 105. The data storage device 100 is in communication with a host device 130.

One example of the functional features provided by the controller 105 are illustrated in FIG. 1. However, the controller 105 is not limited to the structural and functional features provided by the controller 105 in FIG. 1. The controller 105 may include fewer or additional structural and functional features that are not illustrated in FIG. 1.

The data storage device 100 and the host device 130 may be operationally coupled via a connection, such as a bus or a wireless connection. In some examples, the data storage device 100 may be embedded within the host device 130. Alternatively, in other examples, the data storage device 100 may be removable from the host device 130 (i.e., "removably" coupled to the host device 130).

The data storage device 100 may be configured to be coupled to the host device 130 via a communication path, such as a wired communication path and/or a wireless communication path. For example, the data storage device an interface (e.g., a host interface) that enables communication via the communication path between the data storage device 100 and the host device 130.

The host device 130 may include a processor and a memory. The memory may be configured to store data and/or instructions that may be executable by the processor. The memory may be a single memory or may include one or more memories, such as one or more non-volatile memories, one or more volatile memories, or a combination thereof. The host device 130 may issue one or more commands to the data storage device 100, such as one or more requests to erase data at, read data from, or write data to the non-volatile memory 120 of the data storage device 100. For example, the host device 130 may be configured to provide data, to be stored at the memory or to request data to be read from the non-volatile memory 120. The host device 130 may include a mobile smartphone, a music player, a video player, a gaming console, an electronic book reader, a personal digital assistant (PDA), a computer, such as a laptop computer or notebook computer, any combination thereof, or other suitable electronic device.

The host device 130 communicates via a memory interface that enables reading from the non-volatile memory 120 and writing to the non-volatile memory 120. In some examples, the host device 130 may operate in compliance with an industry specification, a Secure Digital (SD) Host Controller specification or other suitable industry specification. The host device 130 may also communicate with the non-volatile memory 120 in accordance with any other suitable communication protocol.

The non-volatile memory 120 of the data storage device 100 may include a non-volatile memory (e.g., NAND, BiCS family of memories, or other suitable memory). In some examples, the memory device 104 may be any type of flash memory. For example, the non-volatile memory 120 may be two-dimensional (2D) memory or three-dimensional (3D) flash memory.

The controller 105 is coupled to ROM 110, RAM 115, and non-volatile memory 120 via a bus, an interface (e.g., interface circuitry), another structure, or a combination thereof. The controller 105 is configured to send data and commands (which may be a cycle operation of a memory block of the non-volatile memory 120) to the non-volatile memory 120 and to receive data from the non-volatile memory 120. For example, the controller 105 is configured to send data and a program or write command to cause the non-volatile memory 120 to store data to a specified address of the non-volatile memory 120. The write command may specify a physical address of a portion of the non-volatile memory 120 (e.g., a physical address of a word line of the non-volatile memory 120) that is to store the data.

The controller 105 is configured to send a read command to the non-volatile memory 120 to access data from a specified address of the non-volatile memory 120. The read command may specify the physical address of a region of the non-volatile memory 120 (e.g., a physical address of a word line of the non-volatile memory 120). The controller 105 may also be configured to send data and commands to the non-volatile memory 120 associated with NAND maintenance operations, background scanning operations, garbage collection operations, and/or wear-leveling operations, or other suitable memory operations.

The controller 105 represents a processor, (for example, a microprocessor, a microcontroller, a field-programmable gate array ["FPGA"] semiconductor, an application specific integrated circuit ["ASIC"], or another suitable programmable device) which may be configured to receive data and/or instructions executable by the controller 105. In some embodiments, the controller 105 includes a processor, a memory, and other associated circuitry (not shown). The memory may be configured to store data and/or instructions that may be executable by the processor. The memory may include a front end module 135, a backend module 155, a buffer management module 160, and a media management layer 165, among other applications, programs, etc. The controller 105 is illustrated in FIG. 1 in a simplified form. One skilled in the art would recognize that a controller may include additional modules or components other than those specifically illustrated in FIG. 1. Additionally, although the data storage device 100 is illustrated in FIG. 1 as including the controller 105, in other implementations, the controller 105 is instead located within the host device 130 or is otherwise separate from the data storage device 100. As a result, operations that would normally be performed by the controller 105 (for example, wear leveling, bad block management, data scrambling, garbage collection, address mapping, etc.) can be performed by the host device 130 or another device that connects to the data storage device 100.

The front end module 135, the backend module 155, the buffer management module 160, and/or the media management layer 165 may be instructions that are executable by the controller 105. While discussed herein as being stored in a memory, in some examples the front end module 135, the backend module 155, the buffer management module 160, and the media management layer 165 may be configured as circuitry within the controller 105 instead of software instructions.

The front end module 135 includes a host interface 140, a physical layer ("PHY") 145, and a throttling module 150. The front end module 135 may be configured to execute one or more firmware background operations associated with the non-volatile memory 120. For example, the front end module 135 may communicate with other components or modules of the data storage device 100 to perform one or more operations described herein. Firmware background operations of the front end module 135 may include read scrub, enhanced post write read ("EPWR"), single-level cell to multi-level cell relocation (".SLC to MLC relocation"), and/or other firmware background operations as required for a given application. In some embodiments, the front end module 135 is stored in a memory of the controller 105. In other embodiments, the front end module 135 may be integrated into the non-volatile memory 120.

The controller 105 is configured to receive data and instructions from the host device 130 and to send data to the host device 130. For example, the controller 105 may send data to the host device 130 via the host interface 140, and the controller 105 may receive data from the host device 130 via the host interface 140.

The backend module 155 represents one or more modules of the data storage device 100 which directly interacts with a NAND flash of the data storage device 100. For example, the backend module 155 may include infrastructure modules (such as, a device clock management module, a thermal management module, etc.) and error correction and detection modules ("ECC").

The buffer management module 160 represents one or more modules which manage buffer (e.g., RAM 110) resources among other hardware and firmware modules.

The media management layer 165 represents a flash translation layer ("FTL") of the data storage device 100. In some examples, the FTL includes one or more modules such as, for example, a logical-to-physical mapping ("L2P") module, relocation modules, and others.

In some embodiments, the data storage device 100 includes one or more other components 125. The one or more other components 125 may include, for example, direct memory access ("DMA"), various sensors, and/or an electronic fuse.

Figure 2:
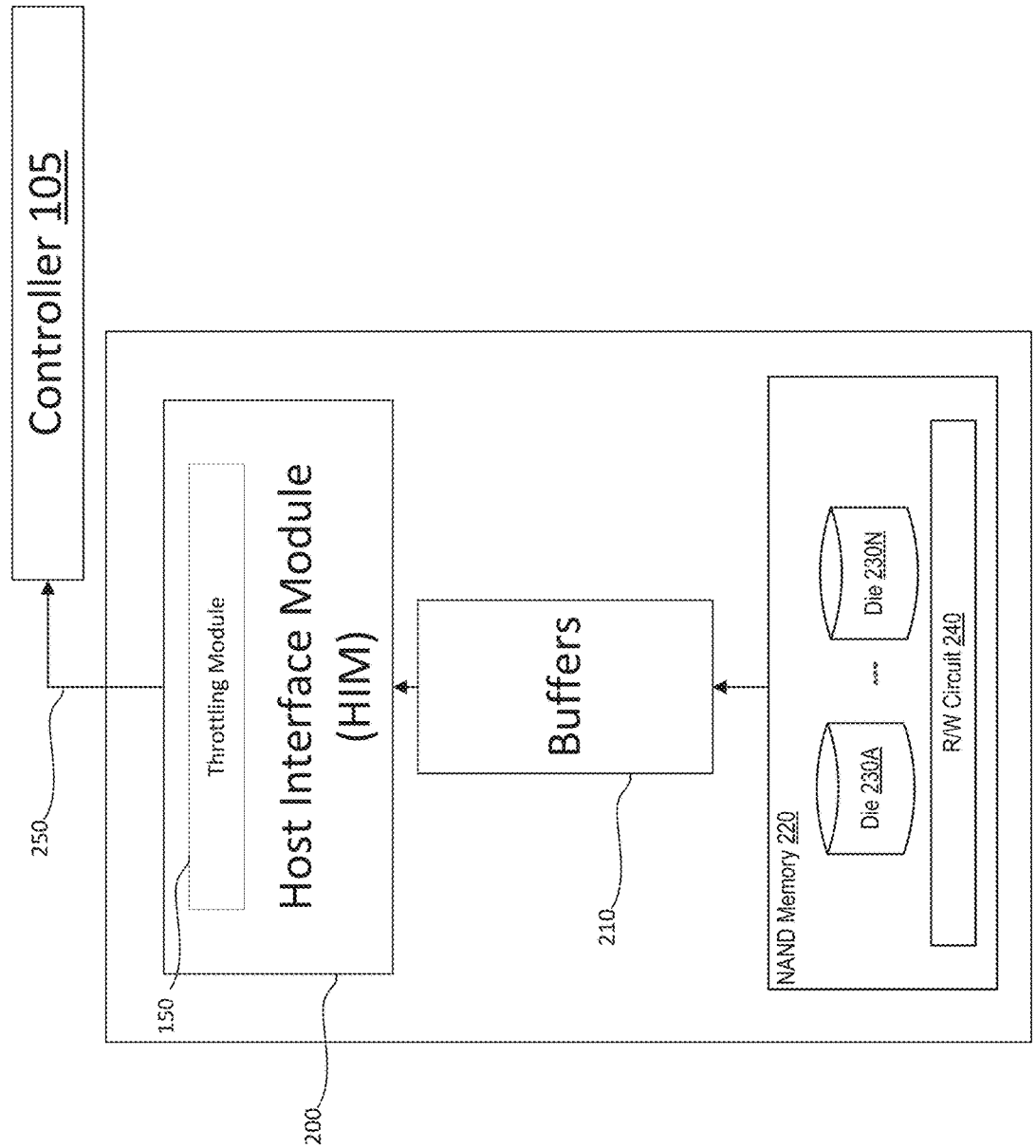
FIG. 2 is a block diagram illustrating one example of the throttling module of FIG. 1, according to some embodiments.

Turning now to FIG. 2, the throttling module 150 is shown in greater detail, in accordance with some embodiments. In the example shown, the throttling module 150 includes a host interface module ("HIM") 200, buffers 210, and a NAND memory 220. One example of the structural and functional features provided by the throttling module 150 are illustrated in FIG. 2. However, the throttling module 150 is not limited to the structural and functional features provided by the throttling module 150 in FIG. 2. The throttling module 150 may include fewer or additional structural and functional features that are not illustrated in FIG. 2.

The NAND memory 220 illustrated in FIG. 2 includes a plurality of dies 230A-230N (for example, NAND dies) and a read/write circuit 240. The read/write circuit 240 is configured to support operation of the plurality of dies 230A-230N of the NAND memory 220. Although depicted as a single component in FIG. 2, the read/write circuit 240 may be divided into separate components of the NAND memory 220, such as a read circuit and a write circuit. The read/write circuit 240 may be external to the plurality of dies 230A-230N of the NAND memory 220. Alternatively, one or more of the plurality of dies 230A-230N of the NAND memory 220 may include corresponding read/write circuitry that is operable to read data from and/or write data to storage elements within the individual die independent of any other read and/or write operations at any of the other dies. For example, each of the plurality of dies 230A-230N may include its own internal read/write circuitry. The NAND memory 220 is communicably coupled to the buffers 210. Data is temporarily stored at buffers 210 when data is read from the NAND memory 220. The data stored at buffers 210 is transmitted to the HIM 200. The HIM 200 is communicably coupled to the controller 105 via an input/output ("I/O") bus 250 and may provide data to other components or modules of the controller 105 and/or the host device 130. The HIM 200 may manage interactions with the host device 130. For example, the HIM 200 may manage data transfers and commands to and from the host device 130 and manage the physical layer of the host device 130 bus protocol.

The controller 105 is also configured to send data and commands to, and receive data from, the NAND memory 220. As an illustrative example, the controller 105 is configured to send data and a program command to instruct the NAND memory 220 to store data in a particular memory location in the NAND memory 220. The controller 105 is also configured to send a read-transfer command to the NAND memory 220 to read data from a particular memory location in the NAND memory 220.

The throttling module 150 is operatively connected to the various modules within the controller 105 and the data storage device 100. For example, firmware is loaded in the ROM 110 of the data storage device 100 as computer executable instructions. Those computer executable instructions are capable of being retrieved from the ROM 110 and executed by the throttling module 150 to control the operation of the controller 105 and perform the processes described herein. In some implementations, one or more modules of the controller 105 correspond to separate hardware components within the controller 105. In other implementations, one or more modules of the controller 105 correspond to software stored within the ROM 110 and/or the non-volatile memory 120 and executed by the controller 105. The ROM 110, RAM 115, and/or the non-volatile memory 120 is configured to store data used by the controller 105 during operation.

Turning now to FIG. 4, a chart 300 illustrating a throttle delay to be programmed for the throttling module 150, is shown, according to some embodiments. The chart 300 illustrates a first host profile ("DDR200") and a second host profile ("SDR104"). The chart 300 shows, for each of the host profiles, DDR200 and SDR104, a transfer speed supported by host (MBPS), a time taken for 1 sector host transfer at host supported speed (in microseconds "µs"), a time taken for a 32 kilobyte (kB) host transfer in (µs), a card max speed (megabytes-per-second "MBPS"), a time taken for a 32 kB host transfer at card max speed (µs), and a throttle delay to be programmed between sectors (µs).

To precisely control host transfers, the controller 105 determines the amount of delay required between each sector transfer and programs the throttling module 150 accordingly. The amount of delay to be programmed depends on factors such as a host frequency profile and a max speed of the storage device. In some embodiments, the amount of throttle delay is determined via one or more instructions stored by the non-volatile memory 120 and executed by the controller 105. In other embodiments, the amount of throttle delay is obtained via a look-up table (e.g., stored by the non-volatile memory 120). Once the throttling module 150 is programmed by the controller 105, data is read from the NAND memory 220 and available in the buffers 210, the host transfers performed at the required speed automatically by the HIM 200. Consequently, the controller 105 is free to perform background operations during host transfer.

In the example shown in FIG. 3, the DDR200 has a transfer rate supported by the host of 200 MBPS, the duration for 1 sector host transfer at the host supported speed is 2.56 µs, and the duration for a 32 kB host transfer is 163.84 µs. At a max transfer rate of 30 MBPS, the duration of a 32 kB host transfer for the DDR200 is 1092.267 µs and the throttle delay to be programmed between sectors is 14.5067 µs. At a max transfer rate of 60 MBPS, the duration of a 32 kB host transfer for the DDR200 is 546.133 µs and the throttle delay to be programmed between sectors is 5.973 µs. At a max transfer rate of 90 MBPS, the duration of a 32 kB host transfer for the DDR200 is 364.089 µs and the throttle delay to be programmed between sectors is 3.1289 µs.

The SDR104 has a transfer rate supported by the host of 104 MBPS, the duration for 1 sector host transfer at the host supported speed is 4.923 µs, and the duration for a 32 kB host transfer is 315.0769 µs. At a max transfer rate of 30 MBPS, the duration of a 32 kB host transfer for the DDR200 is 1092.267 µs and the throttle delay to be programmed between sectors is 12.14358974 µs. At a max transfer rate of 60 MBPS, the duration of a 32 kB host transfer for the DDR200 is 546.13 µs and the throttle delay to be programmed between sectors is 3.61025641 µs. At a max transfer rate of 90 MBPS, the duration of a 32 kB host transfer for the DDR200 is 364.089 µs and the throttle delay to be programmed between sectors is 0.7658 µs.

Turning now to FIG. 4 a table 400 illustrating the available time for background operations according to data storage device max speed, is shown, according to some embodiments. The table 400 shows a max transfer rate (MBPS), a time for a 32 kB transfer at max transfer rate (µs), and a time available for background operations every 32 kB (µs). In some embodiments, the controller 105 is configured to determine the total overhead for a 32 kB host read operation and determine an amount of time available to perform background operations during the 32 kB host read.

In one example, during a 32 kB host read, a read sense time may have a duration of 80 µs, a NAND latch to block random access memory ("BRAM") transfer may have a duration of 160 µs, a low-density parity check ("LDPC") decode duration of 20 µs, and a firmware overhead of 10 µs. Accordingly, the total overhead for the 32 kB host read is 270 µs. The controller 105 may determine the time available for background operations every 32 kB by subtracting the time for a 32 kB transfer at max speed by the total overhead.

Accordingly as is illustrated in FIG. 4, for a card max speed of 30 MBPS and a time for a 32 kB transfer of 1092.267 µs, the time available for background operations ever 32 kB is 822.267 µs. For a card max speed of 60 MBPS and a time for a 32 kB transfer of 546.133 µs, the time available for background operations ever 32 kB is 276.133 µs. For a card max speed of 90 MBPS and a time for a 32 kB transfer of 364.089 µs, the time available for background operations ever 32 kB is 94.089 µs.

Figure 5:
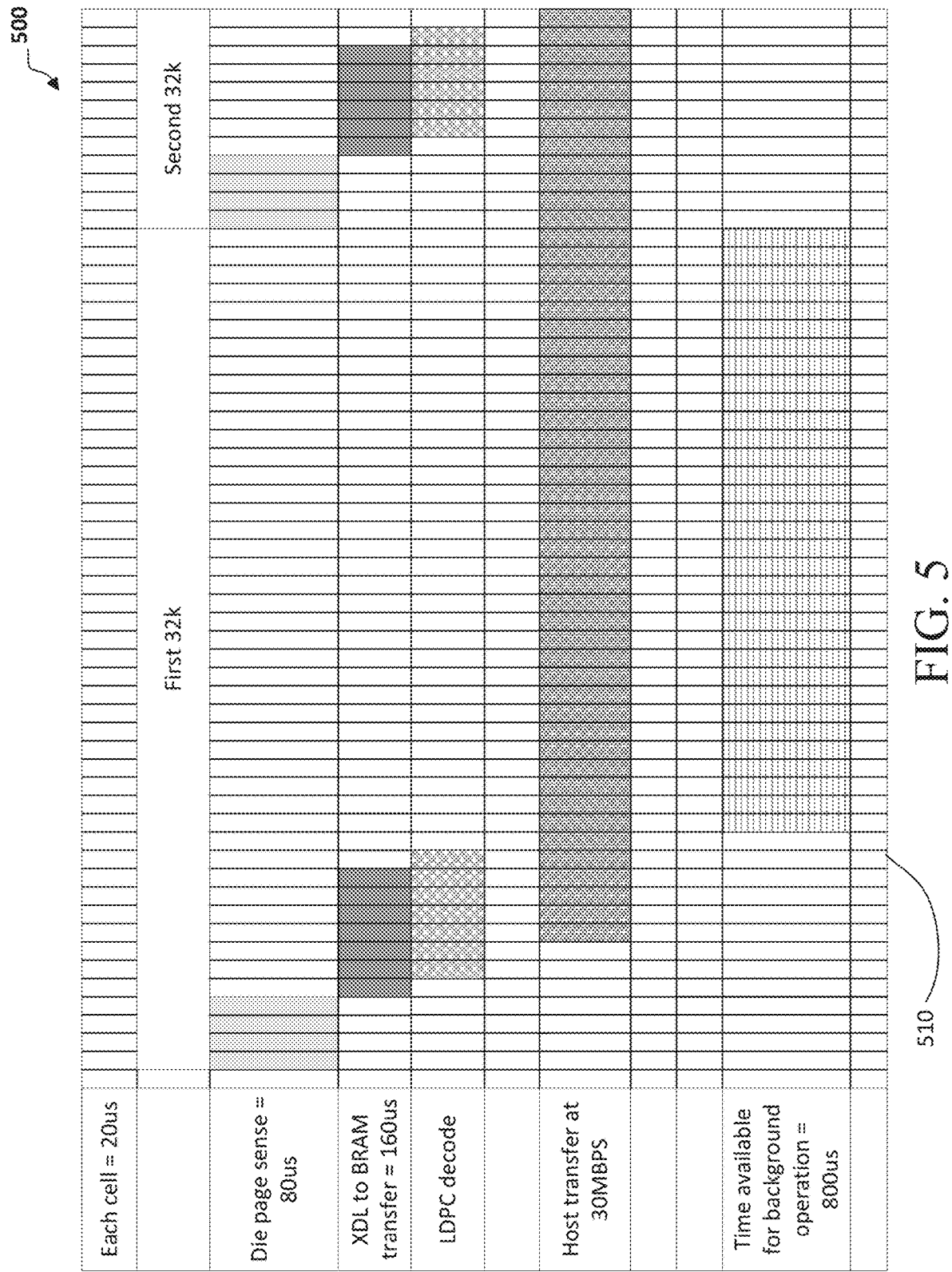
FIG. 5 is a chart illustrating time allocation of various data storage device operations, according to some embodiments.

Turning now to FIG. 5, a chart 500 illustrating time allocation of various operations of the data storage device 100 during a first and second 32 kB host operation, is shown, according to some embodiments. The example illustrated in FIG. 5 is in accordance with the card max speed of 30 MBPS of FIG. 4. The chart 500 illustrates a duration of die page sense, a data latch ("XDL") to BRAM transfer, a LDPC decode, a host transfer, and a time available for background operation during the first and second 32 kB host operation. The x-axis 510 of the chart 500 represents a duration of time in which each operation is performed (µs) during the host read operation.

Since the HIM 200 performs host transfers in accordance with the determined throttle delay, the controller 105 is free to perform background operations during host read. Thus, the duration of a 32 kB host operation in which time is solely allocated to host transfer is available for the controller 105 to perform background operations. In the example illustrated in FIG. 5, during the first 32 kB operation, the die page sense has a duration of 80 µs, the XDL to BRAM transfer has a duration of 160 µs, the LDPC decode in has a duration of 20 µs. Accordingly, the total amount of overhead during the first 32 kB host transfer is 260 µs. Thus, the determined time available for background operation is 800 Is.

It is to be noted that the amount of time available to the controller 105 to background operations only depends on the max speed of the storage device and does not depend on the host profile. The time available for background operations increases as the max host speed decreases. Low-cost data storage devices (e.g., devices which use lower quality NAND memories and have lower max speed) benefit from this relationship as a lower quality NAND memory typically requires more maintenance operations to retain data integrity. Thus, allocating time to perform NAND maintenance without sacrificing peak performance of the data storage device is highly advantageous.

Figure 6:
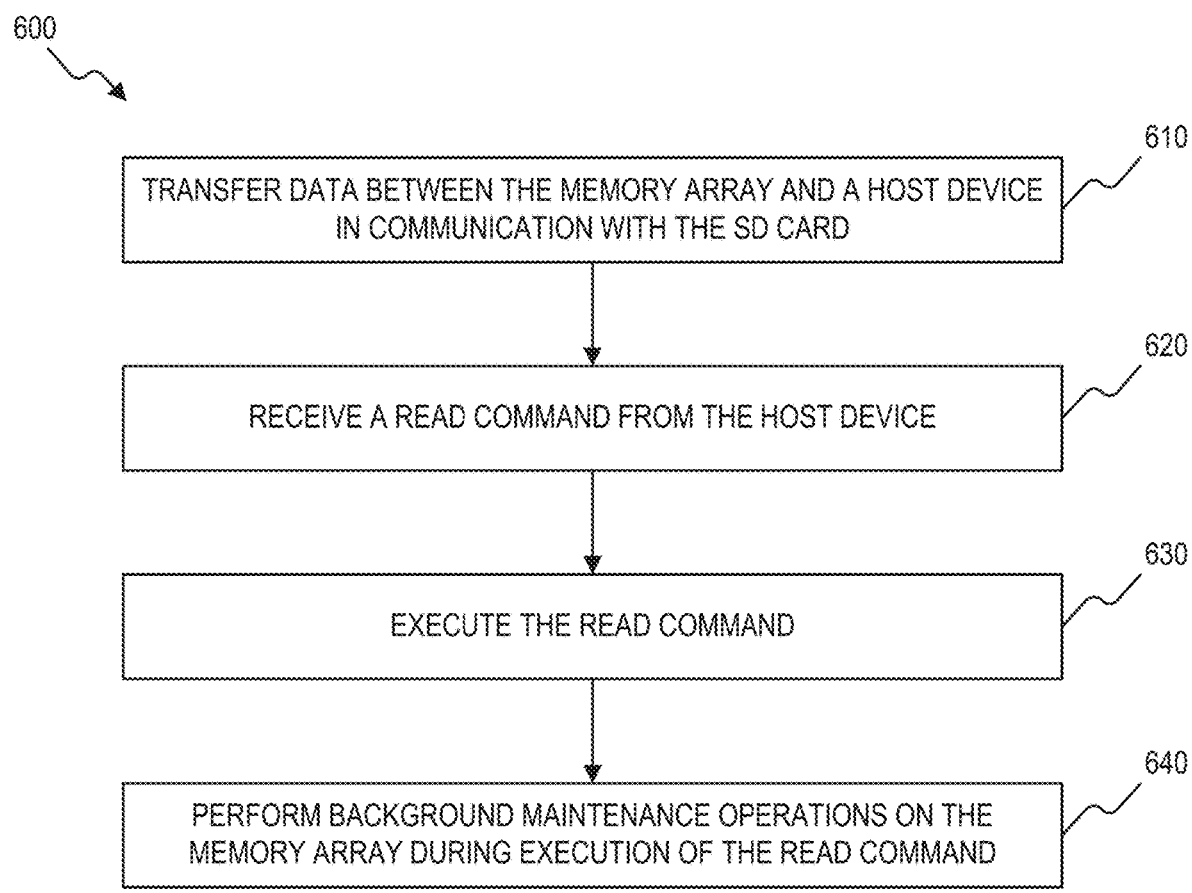
FIG. 6 is a flowchart illustrating a method for performing firmware background operations during host read, according to some embodiments.

Turning to FIG. 6, a flowchart illustrating a method 600 for performing firmware background operations during host read, is shown, according to some embodiments. The method 600 is described as being executed using a controller, such as the controller 105, of a data storage device 100. However, it is understood that the method 600 may be performed by one or more other controllers. Further, while the method 600 is generally described in relation to a single data storage device 100, it is contemplated that the method 600 may be applied to one or more data storage devices in a system.

At block 610, the controller 105 transfers data between a memory array (e.g., the non-volatile memory 120) and the host device 130. In some examples, the controller 105 determines a first duration of a data transfer between the non-volatile memory 120 and the host device 130. In some embodiments, the controller 105 determines the duration of the data transfer based on a predetermined data transfer size, such as 32 kB. It is to be understood that, although, the data transfer is only discussed herein as the transfer size being 32 kB, the data transfer size may be larger or smaller than 32 kB. In some embodiments, the duration of the data transfer is determined based on a known maximum data transfer speed of the data storage device 100 and is obtained by the controller 105 via a look-up table (e.g., stored by the non-volatile memory 120).

At block 620, the controller 105 receives a read command from the host device 130.

At block 630, the controller 105 executes the read command received from the host device 130. In some examples, the method 600 may include the controller 105 determining a second duration of the one or more data transfer support operations that are performed during execution of the read command. For example, the controller 105 performs the one or more data transfer support operations in the foreground of the data storage device, the foreground of representing a state of operation of the data storage device 100 in which data is actively being transferred between the data storage device 100 and the host device 130. In some examples, the duration of the one or more data transfer operations is obtained by the controller 105 via a look-up table (e.g., stored by the non-volatile memory 120). The one or more data transfer operations performed may include, for example, a die page sense, a XDL to BRAM transfer, and/or LDPC decode, or other like operations performed by the data storage device 100 to read data from or write data to the non-volatile memory 120.

At block 640, the controller 105 performs background maintenance operations on the memory array (e.g., the non-volatile memory 120) during the execution of the read command received from the host device 130.

In some examples, the method 600 may include the controller 105 determines an overhead time for the data transfer based on the first duration of the data transfer and the second duration of the one or more data transfer operations. The overhead time represents a duration of time that is available for background operations. For example, the controller 105 may determine that every 32 kB transfer has a duration of 1200 µs and an overhead time of 400 µs. Thus, the controller 105 may determine the duration of time available for background operations is 800 μs based on subtracting the overhead time from the duration of the data transfer.

In some examples, the method 600 may include the controller 105 performs the one or more maintenance operations in the foreground of the data storage device 100. In some embodiments, the one or more maintenance operations are flash read and write maintenance operations performed by the controller 105 to maintain the NAND memory 220. The one or more maintenance operations are operations which are not typically initiated during for host read and write. The one or more maintenance operations may include a read scrub operation, an enhanced post write read ("EPWR") operation, and an SLC to MLC relocation. After the controller 105 determines there is a duration of time to perform background operations, the controller 105 may perform the background operations in the foreground, thus optimizing the performance of the data storage device 100.

In some examples, the method 600 may further include performing one or more maintenance operations in a background of the data storage device 100 to maintain data stored by the non-volatile memory 120. In some examples, the one or more maintenance operations may include a read scrub operation, an EPWR operation, and/or an SLC to MLC relocation.

In some examples, the one or more data transfer support operations of the method 600 may include performing a read sense operation, a NAND latch to BRAM transfer, and/or and LDPC decode.

In some examples, the non-volatile memory 120 may be a NAND memory, and the one or more maintenance operations performed are flash read and write operations performed by the controller 105 to maintain the NAND memory.

In some examples, the method 600 may further include determining a third duration of a sector host transfer of a plurality of sector host transfers, and determining a throttle delay based on the first duration of the data transfer and the third duration of the sector host transfer. In some examples, the method 600 may further include performing the one or more data transfer support operations based on the determined throttle delay.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

As used herein, MLC, which means Multi-Level Cell, refers to memory cells that store more than one bit, such as 2, 3, 4 or more bits. Thus, in this disclosure, MLC includes TLC and QLC.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A SD Card, comprising:
   a memory array;
   a controller coupled to the memory array; and
   a bus for transferring data between the memory array and a host device in communication with the SD Card,
   wherein the controller is configured to:
   determine a first duration of a host transfer between the memory array and the host device,
   determine a second duration of a sector host transfer of a plurality of sector host transfers,
   determine a throttle delay based on the first duration and the second duration,
   perform one or more data transfer support operations based on the determined throttle delay,
   determine a third duration of the one or more data transfer support operations performed during the host transfer,
   determine an overhead time for the host transfer based on the first duration and the third duration,
   determine an amount of time available for background operations based on the overhead time, and
   perform background maintenance operations on the memory array during execution of a read command received from the host device and based on the amount of time available for background operations that is determined.

2. The SD Card of claim 1, wherein the SD Card is powered down within 5 milliseconds of completing execution of the read command.

3. The SD Card of claim 2, wherein the SD Card is powered down when not performing the read command or a write command.

4. The SD Card of claim 1, wherein the background maintenance operations include at least one of:
   a read scrub operation,
   an EPWR operation, and
   an SLC to MLC relocation.

5. The SD Card of claim 1, wherein the controller is further configured to:
 determine a host profile associated with the host device, and
 select the sector host transfer rate from the plurality of host transfer rates based on the host profile that is determined.

6. The SD Card of claim 1, wherein the controller is further configured to:
 program a throttling module according to the determined throttle delay.

7. The SD Card of claim 1, wherein the plurality of host transfer rates includes a rate of thirty megabytes-per-second (MBPS), a rate of sixty MBPS, and a rate of ninety MBPS.

8. A method for performing background maintenance operations on a memory array of a SD Card, the method comprising:
 determining, with a controller, a first duration of a host transfer between a memory array and a host device;
 determining, with the controller, a second duration of a sector host transfer of a plurality of sector host transfers;
 determining, with the controller, a throttle delay based on the first duration and the second duration;
 performing, with the controller, one or more data transfer support operations based on the determined throttle delay;
 determining, with the controller, a third duration of the one or more data transfer support operations performed during the host transfer;
 determining, with the controller, an overhead time for the host transfer based on the first duration and the third duration;
 determining, with the controller, an amount of time available for background operations based on the overhead time;
 receiving a read command from the host device;
 executing the read command with the controller; and
 performing, with the controller, the background maintenance operations on the memory array during execution of the read command received from the host device and based on the amount of time available for background operations that is determined.

9. The method of claim 8, wherein the SD card is powered down within 5 milliseconds of completing execution of the read command.

10. The method of claim 9, wherein the SD card is powered down when not performing the read command or a write command.

11. The method of claim 8, wherein the background maintenance operations includes performing at least one of:
 a read scrub operation,
 an EPWR operation, and
 an SLC to MLC relocation.

12. An apparatus for performing background maintenance operations on a memory array of a SD Card, the apparatus comprising:
 means for determining a first duration of a host transfer between a memory array and a host device;
 means for determining a second duration of a sector host transfer of a plurality of sector host transfers;
 a means for determining a throttle delay based on the first duration and the second duration;
 means for performing one or more data transfer support operations based on the determined throttle delay;
 means for determining a third duration of the one or more data transfer support operations performed during the host transfer;
 means for determining an overhead time for the host transfer based on the first duration and the third duration;
 means for determining an amount of time available for background operations based on the overhead time;
 means for receiving a read command from the host device; and
 means for executing the read command;
 means for performing the background maintenance operations on the memory array during execution of the read command received from the host device and based on the amount of time available for background operations that is determined.

13. The apparatus of claim 12, wherein the background maintenance operations includes performing at least one of:
 a read scrub operation,
 an EPWR operation, and
 an SLC to MLC relocation.

* * * * *